G. R. MOORE.
Pendulum Scales.
No. 3,396.
Patented Jan'y 6, 1844.
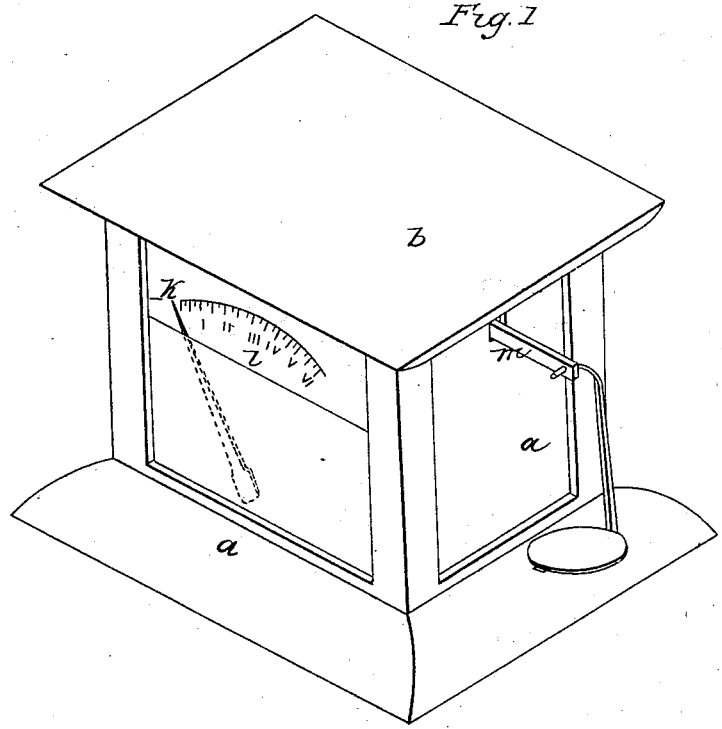
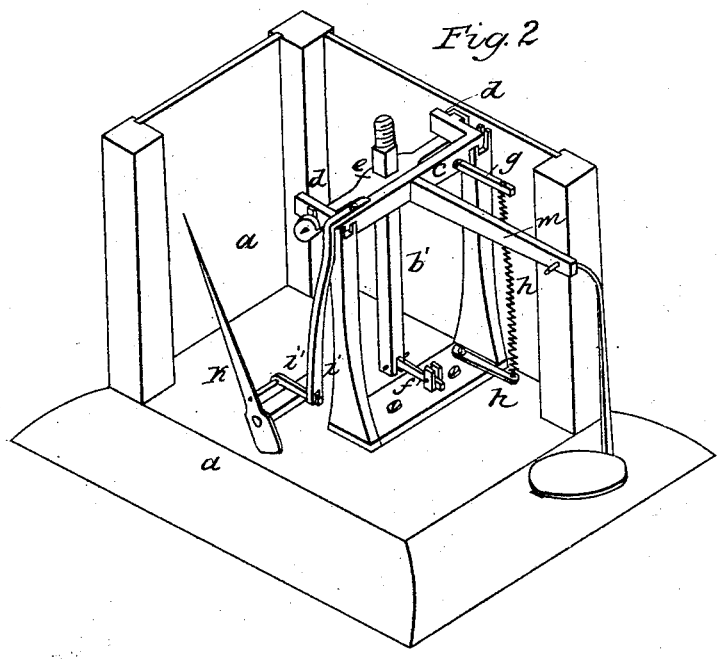

UNITED STATES PATENT OFFICE.

GEORGE R. MOORE, OF BRATTLEBORO, VERMONT.

BALANCE.

Specification of Letters Patent No. 3,396, dated January 6, 1844.

*To all whom it may concern:*

Be it known that I, GEORGE R. MOORE, of Brattleboro, in the county of Windham and State of Vermont, have invented a new and useful Improvement in Platform and other Scales; and I do hereby declare that the following is a full, clear, and exact description thereof, reference being had to the accompanying drawing, which makes a part of this specification, in which—

Figure 1, is an isometrical view of the outside; Fig. 2, an isometrical view with one side and end removed.

The nature of my invention consists in combining the lever and spring in balances, and affixing thereto an index and hand to indicate the weight; the constructions may be various, but I will describe one of the most efficient and that will be universally applicable with a little alteration; this is represented in the drawing.

A square box or pedestal ($a$), of any convenient height contains the machinery; the top ($b$) of this pedestal forms the platform of the scales and is supported by a vertical rod ($b'$) at a little elevation above the sides of the pedestal: the rod has a cross bar ($c$) attached to it near its upper end which rests on knife edges on two short arms ($d$) that project out horizontally from a shaft ($e$) which has its bearings in the frame the lower end of the rod ($b'$) is steadied by a short horizontal lever ($f$) jointed to it and the frame. From the side of the shaft ($e$) opposite the arms ($d$) another arm ($g$) projects, that is screwed into said shaft so as to be lengthened or shortened at pleasure to adjust the scale; this arm is connected with a spring ($h$) below by this arrangement it will be seen that as there is more or less put upon the platform the spring will be more or less contracted by pressing down said platform—to measure this an arm ($i$) extends down and is connected by a rod ($i'$) with a hand ($k$) on an independent fulcrum below the hand indicating by this arrangement the weight on an index ($l$) laid off for that purpose (see Fig. 1,) to the extent of the power of the spring.

The spring above described being limited in its operation I add to the shaft ($e$) another horizontal arm ($m$), on the same side as that marked ($g$), but long enough to extend out beyond the box; on the end of this, weights, similar to those used on the improved steelyards are hung, so as to weigh the heaviest substances the balance will sustain. The weights on the end of lever ($m$) indicate decimal or other definite amounts, and the hand connected with the spring fractional parts thereof on the index, by this means the errors of the spring are not multiplied in weighing the heaviest bodies, and its action is brought within reasonable limits. It will be obvious that this combination of the spring and lever is applicable to steelyards and other modifications of weighing machinery.

Having thus fully described my invention what I claim therein as new and desire to secure by Letters Patent is—

1. The combination of the spring balance with the steelyard substantially in the manner and for the purpose set forth.

2. I also claim in combination with the above the hand or indicator ($k$) and index ($l$) arranged as above specificed.

GEO. R. MOORE.

Witnesses:
L. CALDWELL,
J. J. GREENOUGH.